United States Patent Office.

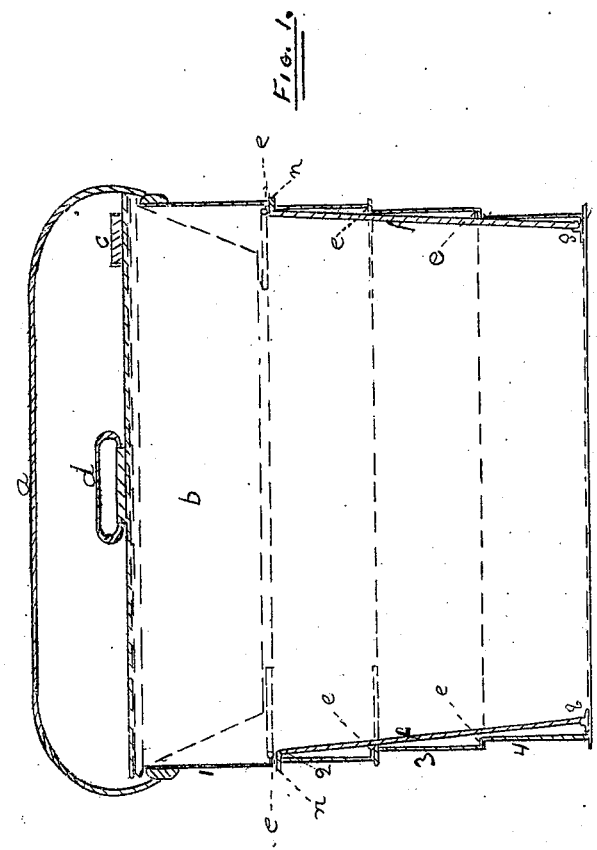

DAVID HOWARTH, OF PORTLAND, MAINE.

Letters Patent No. 71,305, dated November 26, 1867.

IMPROVED DINNER-PAIL.

*The Schedule referred to in these Letters Patent and making part of the same.*

TO ALL WHOM IT MAY CONCERN:

Be it known that I, DAVID HOWARTH, of Portland, in the county of Cumberland, and State of Maine, have invented a new and useful Improved Dinner-Pail; and I hereby declare the following to be a full, clear and exact description thereof, which will enable others to make and use my invention, reference being had to the accompanying drawings, forming part of this specification, in which—

Figure 1 shows a vertical section of my invention when opened or expanded.

Figure 2, a vertical section of the same when collapsed.

$a$ shows the bail of the pail; $b$ the receptacle for liquids; $c$ the nozzle or neck thereof, and $d$ the bail; 1 2 3 4 are the several concentric rings of which the body of the pail is composed; $e$ the overlapping lips or shoulders thereon; $f$ show wires or supports hinged or jointed at the bottom of the pail at $g$.

Letters Patent have previously been granted to me for a dinner-pail, composed of concentric rings, capable of being expanded or shut, and having a fixed compartment in the bottom thereof to contain liquids. Such it is not the purpose of this application to claim.

The position of the fixed compartment at the bottom of the pail has been found inconvenient, both because the other contents of the pail had to be first removed, before the compartment could be emptied, and because the fixed position of said compartment at the bottom of the pail did not admit of its being readily filled or emptied. Moreover, the body of the pail, composed, as it was, of several rings sliding one within another, could not be easily placed upon its bottom without contracting, as shown in fig. 2. It is the purpose of my invention to remedy these objections. The receptacle $b$ is placed in the upper ring 1 of the body of the pail, overlapping the upper edge thereof by a shoulder or lip, thus forming, also, the cover to the pail. This receptacle is also removable, and can be taken out by means of its bail $d$. The food is contained in the other part or body of the pail. The two wires $f$, as before specified, prevent the pail from collapsing when resting upon its bottom. This they accomplish by means of the two bent portions $n$ passing through two small holes in the ring 2 of the body of the pail, as shown in the drawing. When not in use for this purpose, they may be turned down on the inside of the bottom, as shown in fig. 2.

What I claim as my invention, and desire to secure by Letters Patent, is—

The arrangement, in a dinner-pail made as described, of the removable compartment $b$ at the top, and the adjusting-wires $f$, as and for the purposes set forth.

DAVID HOWARTH.

Witnesses:
   W. H. CLIFFORD,
   HENRY C. HOUSTON.